(12) United States Patent
Detmer et al.

(10) Patent No.: US 11,379,446 B1
(45) Date of Patent: Jul. 5, 2022

(54) SESSION-BASED DATA STORAGE FOR CHAT-BASED COMMUNICATION SESSIONS

(71) Applicant: FMR LLC, Boston, MA (US)

(72) Inventors: Allen Detmer, Patriot, IN (US); Maria Lucena, King of Prussia, PA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 17/384,615

(22) Filed: Jul. 23, 2021

(51) Int. Cl.
*G06F 16/22* (2019.01)

(52) U.S. Cl.
CPC .................................... *G06F 16/22* (2019.01)

(58) Field of Classification Search
CPC ....................................................... G06F 16/22
See application file for complete search history.

(56) References Cited

U.S. PATENT DOCUMENTS

| | | |
|---|---|---|
| 7,228,278 B2 | 6/2007 | Nguyen et al. |
| 10,109,297 B2 | 10/2018 | Brown et al. |
| 10,127,224 B2 | 11/2018 | Deleeuw |
| 10,313,404 B2 | 6/2019 | Ein-Gil et al. |
| 10,452,695 B2 | 10/2019 | Rodgers |
| 2012/0041903 A1* | 2/2012 | Beilby ................... G06N 20/00 706/11 |
| 2014/0279050 A1 | 9/2014 | Makar et al. |
| 2017/0148073 A1 | 5/2017 | Nomula et al. |
| 2018/0131643 A1 | 5/2018 | Trufinescu et al. |
| 2019/0095524 A1* | 3/2019 | Rodgers .................. G10L 15/22 |
| 2019/0311036 A1 | 10/2019 | Shanmugam et al. |
| 2020/0007380 A1* | 1/2020 | Chen ...................... H04L 41/046 |

OTHER PUBLICATIONS

"Gathering information with slots," IBM Cloud Docs / Watson Assistant (Managed), retrieved from https://cloud.ibm.com/docs/assistant?topic=assistant-dialog-slots on Feb. 16, 2021, 12 pages.

* cited by examiner

*Primary Examiner* — Jensen Hu
(74) *Attorney, Agent, or Firm* — Proskauer Rose LLP

(57) ABSTRACT

Methods and apparatuses are described for session-based data storage for chat-based communication sessions. A computing device connects to a data storage area associated with an active chat-based communication session, the data storage area comprising data storage slots. The computing device identifies a first data event during the chat-based communication session, the first data event comprising one of a data capture event, a data retrieval event, or a data prefill event. The computing device identifies a data storage slot in the data storage area corresponding to the first data event, the data storage slot comprising a slot name and a slot value. The computing device selects data elements associated with the chat-based communication session for insertion into the data storage slot based upon the event type of the first data event. The computing device stores the selected data elements in the data storage slot for retrieval during the chat-based communication session.

28 Claims, 5 Drawing Sheets

SESSION-BASED DATA STORAGE FOR CHAT-BASED COMMUNICATION SESSIONS

TECHNICAL FIELD

This application relates generally to methods and apparatuses, including computer program products, for session-based data storage for chat-based communication sessions.

BACKGROUND

As computing technology has become commonplace, many users have abandoned the use of live telephone conversations with service agents and representatives to answer questions and resolve issues, in favor of electronic communications such as text-based online chat sessions over the Internet that involve the use of computing devices and related chat-based software. In order to efficiently manage this form of communication, many organizations are turning to automated conversation service software applications (such as chatbots and virtual assistants) to interact with end users intelligently using advanced language processing and data interpretation techniques. Many times, a conversation service software application can either resolve the end user's inquiry altogether or sufficiently identify the intent behind the end user's inquiry so that the chat-based communication session can be routed to a live customer service agent best equipped to handle the end user's request.

However, the aforementioned conversation service software applications often lack robust persistence of session-based knowledge, such as session context data, during a chat-based communication session. For example, certain conversation service applications may only store session context data temporarily during a single discrete request-response interaction and thus have to constantly request the same information from the end user which can be a negative experience. In addition, some conversation service applications store session context data in a local state cache object, which may not be suitable to enable cross-reference of session context data among the many different types of conversation service applications that may be utilized by an organization.

SUMMARY

Therefore, what is needed are improved computerized methods and systems for session-based data storage in chat-based communication sessions. The techniques described herein advantageously provide a platform-agnostic mechanism for temporary, session-wide storage of data elements used during a specific chat-based communication session, such that a dialog workflow used by the conversation service application can be configured to seamlessly capture, retrieve, and/or prefill data elements used in the chat session—resulting in a more positive end user experience and more efficient execution of the dialog workflow. In addition, the methods and systems described herein provide for the storage of both static data elements and dynamic expressions, which when evaluated by the conversation service application, can advantageously enable a more customized, flexible and responsive chat session. Finally, the session-based data storage techniques described herein can be integrated with a conversation service application to obtain data from a wide variety of local and external sources, such as state-based data objects of the conversation service application, other session-based storage data slots, and external resources such as APIs, data feeds, and cloud-based services.

The invention, in one aspect, features a computer system for session-based data storage for chat-based communication sessions. The system comprises a computing device having a memory that stores computer-executable instructions and a processor that executes the computer-executable instructions. The computing device connects to a data storage area associated with an active chat-based communication session, the data storage area comprising one or more data storage slots. The computing device identifies a first data event during the active chat-based communication session, the first data event comprising one of a data capture event, a data retrieval event, or a data prefill event. The computing device identifies a data storage slot in the data storage area corresponding to the first data event, the data storage slot comprising a slot name and a slot value. The computing device selects one or more data elements associated with the active chat-based communication session for insertion into the data storage slot based upon the event type of the first data event. The computing device stores the selected data elements in the data storage slot for retrieval during the active chat-based communication session.

The invention, in another aspect, features a computerized method of session-based data storage for chat-based communication sessions. A computing device connects to a data storage area associated with an active chat-based communication session, the data storage area comprising one or more data storage slots. The computing device identifies a first data event during the active chat-based communication session, the first data event comprising one of a data capture event, a data retrieval event, or a data prefill event. The computing device identifies a data storage slot in the data storage area corresponding to the first data event, the data storage slot comprising a slot name and a slot value. The computing device selects one or more data elements associated with the active chat-based communication session for insertion into the data storage slot based upon the event type of the first data event. The computing device stores the selected data elements in the data storage slot for retrieval during the active chat-based communication session.

Any of the above aspects can include one or more of the following features. In some embodiments, when the first data event is a data retrieval event, selecting one or more data elements associated with the active chat-based communication session comprises retrieving one or more data elements from one of (i) session context data for the chat-based communication session or (ii) an external data source. In some embodiments, the one or more data elements are selected from (i) a response message in the active chat-based communication session, (ii) session context data for the active chat-based communication session, or (iii) other data storage slots in the data storage area. In some embodiments, the computing device captures the session context data when the active chat-based communication session is initialized. In some embodiments, the session context data comprises attributes of a user of the remote computing device and attributes of the active chat-based communication session.

In some embodiments, the slot value of the data storage slot comprises a dynamic expression. In some embodiments, selecting one or more data elements associated with the active chat-based communication session for insertion into the data storage slot based upon the event type of the first data event comprises evaluating the dynamic expression to determine one or more data elements to insert into the data storage slot. In some embodiments, the slot value of the data storage slot comprises a static data element.

In some embodiments, when the first data event is a data prefill event, selecting one or more data elements associated with the active chat-based communication session comprises: determining a data element to be requested from the remote computing device during the active chat-based communication session; identifying another data storage slot in the data storage area that is associated with the data element to be requested from the remote computing device; validate the slot value of the another data storage slot, and when the slot value of the another data storage slot is invalid, generate a request for the data element from the remote computing device and insert the request for the data element into the active chat-based communication session. In some embodiments, validating the slot value of the another data storage slot comprises determining that the slot value of the another data storage slot is one of a non-zero value or a non-null value. In some embodiments, determining that the slot value of the another data storage slot is one of a non-zero value or a non-null value comprises evaluating a dynamic expression in the slot value of the another data storage slot.

In some embodiments, the active chat-based communication session is established with the remote computing device via a virtual assistant application. In some embodiments, retrieving one or more data elements from an external data source comprises applying a function that transforms the one or more data elements before storing the one or more data elements in the slot value of the data storage slot. In some embodiments, the first data event is part of a dialog workflow that comprises a plurality of data events.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
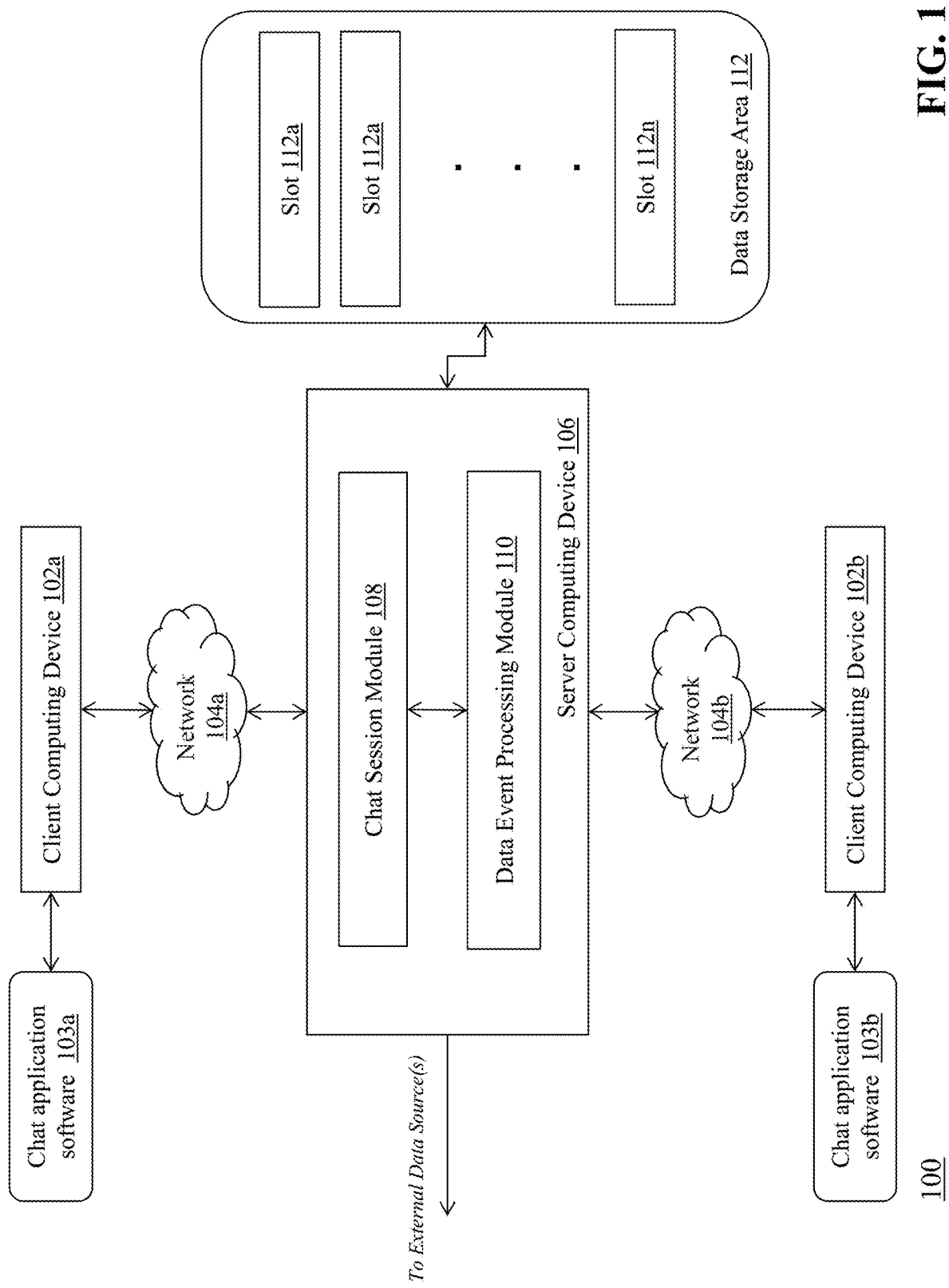
FIG. 1 is a block diagram of a system for session-based data storage for chat-based communication sessions.

FIG. 1 is a block diagram of a system 100 for session-based data storage for chat-based communication sessions. The system 100 includes client computing devices 102a, 102b each including chat application software 103a, 103b respectively, communications networks 104a, 104b, a server computing device 106 that includes a chat session module 108 and a data event processing module 110, and a data storage area 112 that includes a plurality of data storage slots 112a-112n. The server computing device 106 is also connected to one or more external data source(s) (e.g. databases, data feeds, API endpoints, etc.) from which the server computing device 106 can retrieve data elements as described herein.

The client computing devices 102a, 102b connect to one or more communications networks (e.g., 104a, 104b respectively) in order to communicate with the server computing device 106 to provide input and receive output relating to one or more chat-based communication sessions including session-based data storage as described herein. Exemplary client computing devices 102a, 102b include but are not limited to desktop computers, laptop computers, tablets, mobile devices, smartphones, smart appliances, and the like. It should be appreciated that other types of computing devices that are capable of connecting to the components of the system 100 can be used without departing from the scope of invention. Although FIG. 1 depicts two client computing devices 102a, 102b, it should be appreciated that the system 100 can include any number of client computing devices.

Each of the client computing devices 102a, 102b is configured with chat application software 103a, 103b respectively. The chat application software 103a, 103b enables each of the client computing devices 102a, 102b to establish a chat-based communication session with the other client computing device via the chat session module 108 of server computing device 106. In some embodiments, the chat application software comprises a native application. In other embodiments, the chat application software comprises a browser-based application, such as a plugin or embedded module that runs in a browser application. For example, a native application is a software application (also called an 'app') that is installed locally on the client computing device and written with programmatic code designed to interact with an operating system that is native to the client computing device. In the example where the client computing device is a mobile device such as a smartphone, the native application software is available for download from, e.g., the Apple® App Store or the Google® Play Store. In some embodiments, the native application includes a software development kit (SDK) module that is executed by a processor of the client computing device to perform functions associated with establishing a chat-based communication session as described herein.

In an example, a browser-based application comprises software executing on a processor of the client computing device that enables the client computing device to communicate via HTTP or HTTPS with remote servers addressable with URLs (e.g., web server 108) to receive website-related content, including one or more webpages, for rendering in the browser application and presentation on a display device coupled to the client computing. Exemplary browser application software includes, but is not limited to, Firefox™, Chrome™ Safari™, and other similar software. The one or more webpages can comprise visual and audio content for display to and interaction with a user. In some embodiments, the browser application includes a plug-in (e.g., Java™ or Javascript™) that is executed by the browser application to render a chat window for conducting a chat-based communication session. In some cases, the chat window is a pop-up window separate from the browser application, while in other cases the chat window is embedded in a webpage displayed by the browser application.

The communications networks 104a, 104b enable the respective client computing devices 102a, 102b to communicate with the server computing device 106. The networks 104a, 104b are typically wide area networks, such as the Internet and/or a cellular network. In some embodiments, the networks 104a, 104b are comprised of several discrete networks and/or sub-networks (e.g., cellular to Internet). In some embodiments, the networks 104a, 104b can be part of the same overall network topography and/or the client computing devices 102a, 102b can connect to the server computing device 106 using the same network.

The server computing device 106 is a device including specialized hardware and/or software modules that execute on a processor and interact with memory modules of the server computing device 106, to receive data from other components of the system 100, transmit data to other components of the system 100, and perform functions for establishing and conducting chat-based communications sessions including session-based data storage as described herein. The server computing device 106 includes a chat session module 108 and a data event processing module 110 that execute on the processor of the server computing device 106. In some embodiments, the modules 108, 110 are specialized sets of computer software instructions programmed onto one or more dedicated processors in the server computing device.

As can be appreciated, in some embodiments the chat session module 108 comprises a conversation service application (i.e. chatbot, virtual assistant) configured to automatically interact with a user at client computing device 102a in order to gather information and/or respond to inquiries. An exemplary conversation service application can be based upon a natural language processing (NLP) architecture which intelligently parses text messages received from client computing devices to understand the context of the message and how to best respond to it. In some embodiments, an NLP-based chatbot comprises one or more objects (e.g. Javascript objects) that correspond to the chatbot state and can be useful for storing specific chat session context data relating to the particular state that the chatbot is currently in. As can be appreciated, many chatbots are modeled as state machines, where each message and/or response to a message (and the corresponding intents, parameters, and actions) results in a different state of the chatbot. The chatbot can utilize a state cache (e.g., a local cache maintained by the chatbot) that stores a state object used to temporarily capture data elements associated with the current state of the chatbot. However, the state cache/state object can be undesirable for certain types of data elements, such as data that may be reused in different chat session states or data that may need to be combined with other sources. In these cases, the data storage slots of data storage area 112 can be advantageously employed as described herein.

Although the modules 108, 110 are shown in FIG. 1 as executing within the same server computing device 106, in some embodiments the functionality of the modules 108, 110 can be distributed among one or a plurality of other computing devices that are coupled to the server computing device 106. As shown in FIG. 1, the server computing device 106 enables the modules 108, 110 to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. The functionality of the modules 108, 110 will be described in greater detail throughout this specification.

The data storage area 112 is a memory location (resident on a computing device or in some embodiments, a plurality of computing devices) coupled to the server computing device 106. The data storage area 112 is configured to receive, generate, and store specific segments of data relating to the process of establishing and conducting chat-based communications sessions including session-based data storage as described herein. In some embodiments, all or a portion of the data storage area 112 can be integrated with the server computing device 106 or be located on a separate computing device or devices. As shown in FIG. 1, the data storage area 112 provides a plurality of data storage slots 112a-112n for storage of certain types of data. As can be appreciated, the system 100 can include one or more than one data storage area 112, each having data storage slots. In some embodiments, the data storage area 112 is configured as part of an object resident in the conversation service application (i.e. chatbot) of server computing device 106 that manages the chat session with the client computing device 102a. As explained above, a chatbot can include a state cache with one or more objects that are used by the chatbot for particular states. In some embodiments, the data storage area 112 is allocated as part of the state cache so that the data storage slots 112a-112n can be accessed from the state cache—for example, if the chatbot state cache is an object 'state.nlp.*' the data storage area 112 can be a particular location in the cache, such as state.nlp.sessionSlots.*' and each slot 112a-112n in the data storage area 112 can be a different sublocation based upon the identifier assigned to the slot, e.g. 'state.nlp.sessionSlots.firstSlot' and the like. In this way, the chatbot can beneficially use the data storage area 112 in the state cache as a place to store arbitrary values used during the chat session but which may not be desirable to include in the normal storage locations. In addition, in some embodiments the data storage area 112 can be commonly used across different chatbot applications that may be utilized by the server computing device 106.

In some embodiments, each data storage slot 112a-112n is configured with an identifier (e.g. key, name, or other type of identifier) that uniquely identifies the slot in a particular data storage area 112. In some cases, the slot identifier is associated with the particular slot as well as the particular data storage area 112 in which the slot is located. In still other cases, the slot identifier is further associated with the particular chat-based communication session to which the slot is assigned or otherwise associated. This avoids the creation of slots with the same identifier, which could cause data access and data integrity errors. In some embodiments, each data storage slot 112a-112n is also configured with a slot value. The slot value can be a static value (such as a number, a text string, etc.) that is stored in the slot, or the slot value can be a dynamic expression that is evaluated by the data event processing module 110 in order to determine a data value that corresponds to the slot. In one example, the dynamic expression can be a Handlebars expression (as described at handlebarsjs.com/) that the data event processing module 110 executes to read an object inside the conversation service application (i.e. chatbot), such as the state object. An exemplary Handlebars expression could be {{state.nlp.sessionSlots.firstSlot.value}} which resolves to the value stored in the first data storage slot of the data storage area 112. In some embodiments, each data storage slot 112a-112n can be configured with a lifecycle value that is used to instruct the chat session module 108 if the value in the data storage slot should be kept for the remainder of the chat-based communication session or be removed after a single use. Exemplary values can be "USE_ONCE" (for single use) or "SESSION" (for keeping a value across the entire session).

An exemplary definition for a data storage slot is as follows:
{
  saveAs: Fullname,
  saveValue: '{{statelocation.FirstName}} {{state.location.LastName}}',
  lifeCycle: 'SESSION'
} where "saveAs" is used to indicate the unique key/name to assign to the slot when saving, "saveValue" is used to save a dynamic or static value (optionally) for the session slot, and "lifecycle" is used to decide whether the slot should remain throughout the session or only for single use.

In some embodiments, when the value to save to a particular data storage slot is static, the chat session module 108 and/or data event processing module 110 can immediately add the value to, e.g., a context object for the chat-based communication session and remove the value from an object of the data storage area 112. In some embodiments, when the value to save to a particular data storage slot is associated with a dynamic expression and the data elements/context needed to resolve the dynamic expression are not present (e.g. in the state cache or other object areas), the chat session module 108 and/or data event processing module 110 can keep the slot active in the data storage area 112 until the expression can be resolved—at which point the resulting value is stored in a context object for the chat session and removed from the data storage area 112. For example, a certain dynamic expression may require elements that are not available or ready at the current state of the chatbot, but will be available after a few more steps are taken in the dialog workflow. It should be appreciated that the above storage actions are exemplary and that other storage actions can be used for static and/or dynamic slots.

In some embodiments, each chat-based communication session established between two or more client computing devices is associated with a different data storage area 112. For example, when a chat-based communication session is established, the server computing device 106 can initialize a new data storage area (e.g., in the chatbot state cache) with one or more data storage slots to be used by the chat-based communication session. Then, when the session has ended, the server computing device 106 can delete or de-allocate the data storage area 112, freeing up the resources for the next chat-based communication session.

Figure 2:
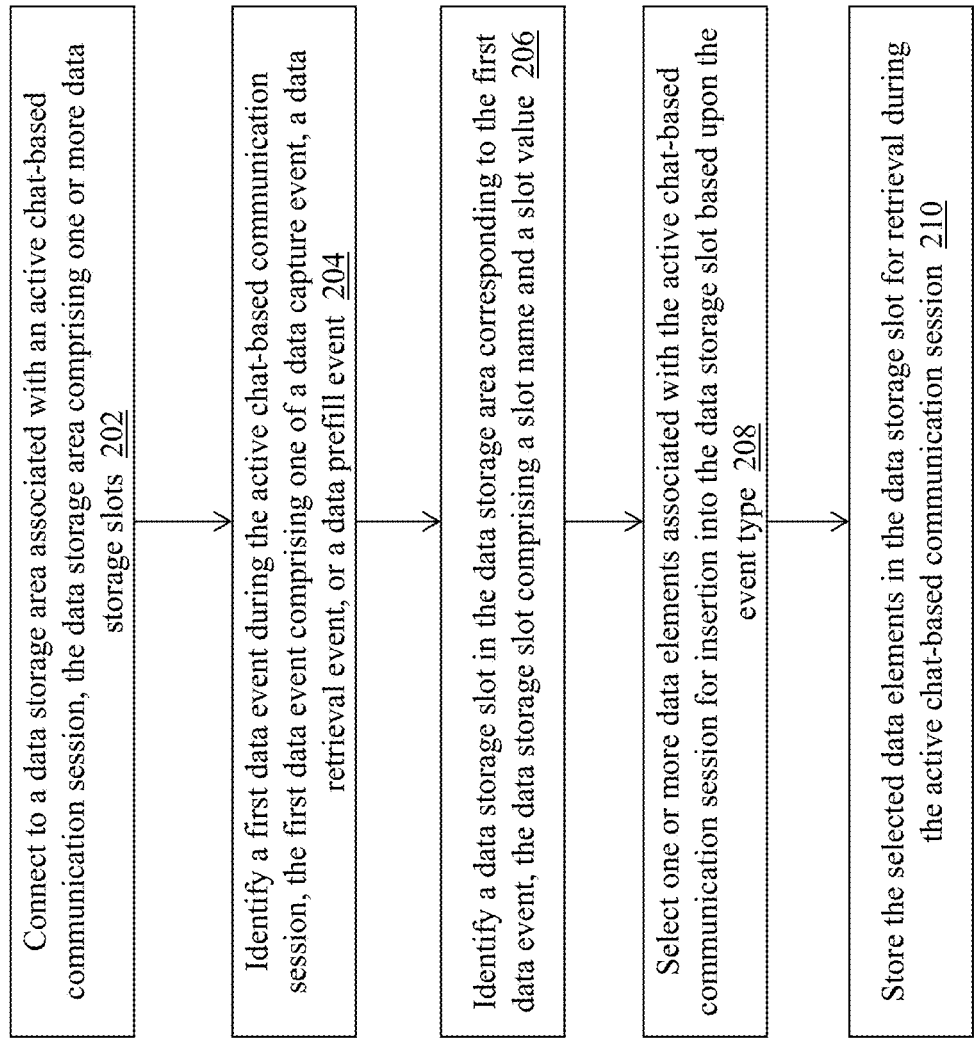
FIG. 2 is a flow diagram of a computerized method of session-based data storage for chat-based communication sessions.

FIG. 2 is a flow diagram of a computerized method 200 of session-based data storage for chat-based communication sessions using the system 100 of FIG. 1. A user at client computing device 102a can launch the chat application software 103a in order to establish a chat-based communication session with a user at client computing device 102b. For example, the user at client computing device 102a can be a customer that needs assistance with a transaction or has an information request, and the user at client computing device 102b can be a customer service representative (CSR) trained to respond to the customer's inquiries. In another example, as mentioned above the server computing device 106 can first establish a chat-based communication session with an automated service provided by the server 106, such as a conversation service application (chatbot or other type of programmatic agent executed by the chat session module 108 that is configured to automatically parse customer chat messages and respond appropriately). In some cases, the chatbot can gather initial information from the user and/or the client computing device 102a (e.g., user input, metadata, communication session data, packet data, etc.) that can be stored in the data storage area 112 for retrieval after the system transfers the active chat-based communication session to a human agent (e.g., CSR) at client computing device 102b. For example, the chatbot can be configured to follow a dialog workflow that includes one or more data events (e.g., data capture, data retrieval, data prefill) processed by the data event processing module 110 to collect data elements from the client computing device 102a, from the user of device 102a, from one or more external data sources, and/or insert data elements into one or more slots of the data storage area 112 as a way to initialize the chat session with relevant data elements. This configuration enables the system to automatically collect important information that can be used to respond to the customer's requests during the active chat session and/or route the customer's chat session to an appropriate CSR without requiring the user to enter the information again upon connecting to the CSR.

Once the user at client computing device 102a launches the chat application software 103a and establishes a connection to the chat session module 108 at server computing device 106, the chat session module 108 can establish a chat-based communication session with the client computing device 102a (e.g. via a chatbot, as described above) and then connect to (step 202) a data storage area 112 associated with the active chat-based communication session. As mentioned previously, in some embodiments the chat session module 108 initializes a new data storage area 112 for each active chat-based communication session while in other embodiments, the chat session module 108 can reuse one or more existing data storage areas. The chat session module 108 can create a new object in the conversation service application and/or use the existing state cache object and define a separate area (e.g., state.nlp.sessionSlots.*').

Upon connecting to the data storage area 112, the chat session module 108—alone or in conjunction with the data event processing module 110—identifies (step 204) a first data event during the active chat-based communication session. For example, as mentioned above the first data event can be part of a dialog workflow that is executed by the conversation service application of the chat session module 108 upon initialization of the chat session to collect information to be used during the chat session. The first data event can occur at the initialization of the chat session or at some other point during the active chat session when messages are being exchanged between the chatbot and client computing device 102a. In some embodiments, the data collected by the chat session module 108 during establishment of the chat session and/or during the exchange of messages in the active chat session is called session context data.

As mentioned above, the data events can be one of a number of different event types: data capture events, data retrieval events, or data prefill events. A data capture event is an event where a data element relating to an intent (i.e. a user's intention, which informs how the chatbot responds) is captured. In one example, the chatbot may send a message to the client computing device 102a asking the user what type of assistance he or she needs (e.g. "How can I help you today?"). The user can respond with a specific topic or subject area that the chatbot is configured to parse and interpret in order to proceed to a following step in the dialog workflow. The user's response is interpreted by the chatbot in order to determine the user's intent, at which point the chatbot can take one or more different actions based upon the determined intent. As part of this process, the chatbot can capture certain data elements that assist the chatbot in responding to the user and/or may be useful to the chatbot for later steps in the workflow (e.g., customer name, account number, transaction history, profile, etc.). In some data capture events, multiple data elements from one or more sources (e.g., client computing device 102a, external data source, other data storage slots) is captured. For example, one or more data elements for a given data capture event can be inferred from current session context data of the chat session (e.g. state cache, etc.).

A data retrieval event is an event where the chatbot communicates with one or more other data resources (e.g. external data sources, data feeds, application programming interface (API) calls) in response to a customer intent. In some cases, the chatbot can pass data to the other data resources that is needed by these data resources in order to provide the correct data. For example, the external data source may be a customer transaction database and the chatbot can inject one or more data elements from the data storage area 112 (e.g., customer ID) into a call to the external data source so that the external data source can retrieve the correct information and pass it back to the chatbot. A data prefill event is an event where the chatbot uses existing chat session context data elements to insert into responses to the user. The data prefill event is beneficial to avoid having to ask a user for information that he or she has already provided. For example, when a chat session is initialized, the chatbot can capture the user's first name and last name (e.g. by looking them up using a customer ID or IP address embedded in packets sent from the client computing device 102a and/or chat application software 103a) and store the first and last name values in one or more slots 112a-112n of data storage area 112. Then, when preparing a response to the user (e.g., "Hello <firstname>"), the chatbot can simply insert the user's first name into the response instead of asking the user to provide it—which both saves time in the chat session and provides a better experience for the user. It should be appreciated that other event types can be utilized within the scope of invention.

When the chat session module 108 identifies a first data event (e.g., as represented in the dialog workflow), the data event processing module 110 identifies (step 206) a data storage slot (e.g., slot 112a) in data storage area 112 corresponding to the first data event. For example, the dialog workflow executed by the chat session module 108 can include one or more data events that are defined to interact with specific data storage slots (e.g., state.nlp.sessionSlots.firstSlot). As will be described below, the data event processing module 110 can identify the data storage slot(s) defined in the data event and, in some embodiments, validate that the data storage slot(s) exist and can be used to store and/or retrieve data element(s).

After identifying the data storage slot, the data event processing module 110 selects (step 208) one or more data elements associated with the active chat-based communication session for insertion into the data storage slot based upon the event type. As described previously, the data event processing module 110 can collect certain data elements from a variety of sources (e.g., chatbot state objects, external data sources, other data storage slots, etc.) for insertion into one or more of the identified data storage slots. In some embodiments, the data event processing module 110 can transform data elements prior to insertion into a data storage slot. For example, the data event processing module 110 may retrieve a data element from another data storage slot, then evaluate a dynamic expression stored in the identified data storage slot which modifies the retrieved data element to produce a new data element value for storage in the identified data storage slot. Transformations can include, but are not limited to, merging data elements, performing arithmetic operations on data elements, filtering sets of data elements to refine results, and the like.

After selecting the data elements, the data event processing module 110 stores (step 210) the selected data elements in the data storage slot(s) for retrieval during the active chat-based communication session. As described above, the data event processing module 110 can store the data element temporarily in a data storage slot for use by the chat session module 108 during an exchange of messages with the user at client computing device 102a. The data element may be stored for a single use or for the entire chat session, at which point the data storage slot can be cleared and/or removed.

Figure 3:
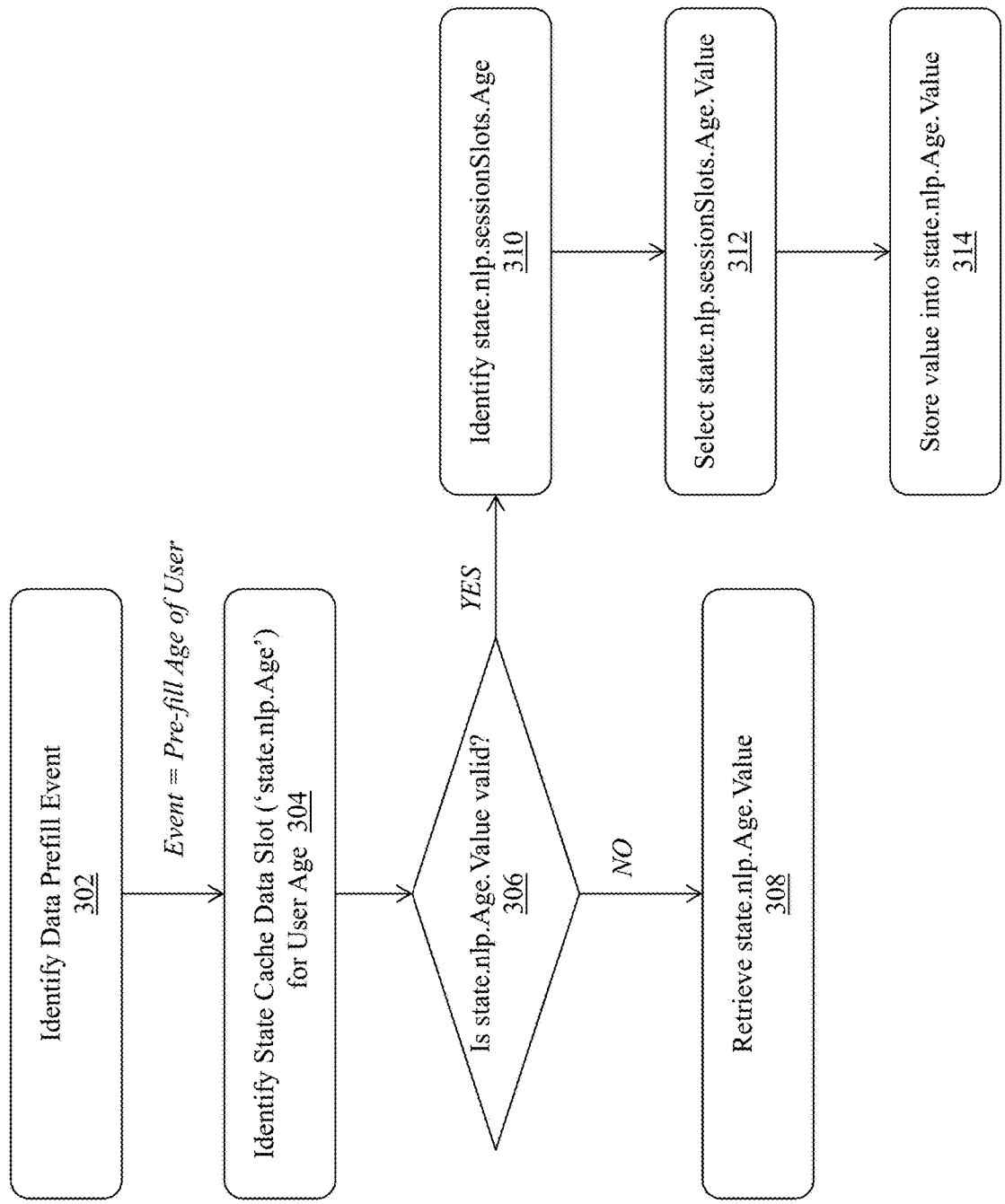
FIG. 3 is a workflow diagram of a method for completion of a data prefill event for a chat-based communication session.

The following paragraphs provide illustrative examples of the workflow of the chat session module 108 and data event processing module 110 for each of the specific data event types described above. FIG. 3 is a workflow diagram of a method 300 for completion of a prefill data event, using the system 100 of FIG. 1. As shown in FIG. 3, the chat session module 108 executes a dialog workflow and identifies (step 302) a data prefill event—in this instance, the data prefill event is to pre-fill the age of the user (e.g., as previously captured from another data source and/or provided by the user during initialization of the chat session and stored in the data storage area 112 with a SESSION lifecycle). For example, the chatbot of chat session module 108 may be preparing a response to the user using the dynamic expression "To confirm, your current age is {{state.nlp.Age.Value}}?" where the expression 'state.nlp.Age.Value' refers to the state cache object of the chatbot. Upon detecting the data prefill event, the chat session module 108 instructs the data event processing module 110 to process the data prefill event. The data event processing module 110 identifies (step 304) the state cache data slot (i.e., state.nlp.Age') that is the default storage location for the user's age. The data event processing module 110 then determines (step 306) whether the value of that state cache slot (state.nlp.Age.Value) is valid (e.g., a positive numeric value) or invalid (e.g., a null value or a zero value). If the value of the state cache slot is valid, then the data event processing module 110 retrieves (step 308) the value and returns it to the chatbot for insertion into the above response message. However, if the value of the state cache slot state.nlp.Age.Value is invalid, the data event processing module 110 identifies (step 310) the data storage slot 112a (state.nlp.sessionSlots.Age) where the user's age was previously stored in the data storage area 112. The data event processing module 110 selects the value from the data storage slot 112a (i.e. state.nlp.sessionSlots.Age.Value) and stores (step 314) the value into the state cache object at state.nlp.Age.Value. In some embodiments, the data event processing module 110 can just return the age value to the chat session module 108 for generation of the message instead of also storing the value in the state cache object.

Figure 4:
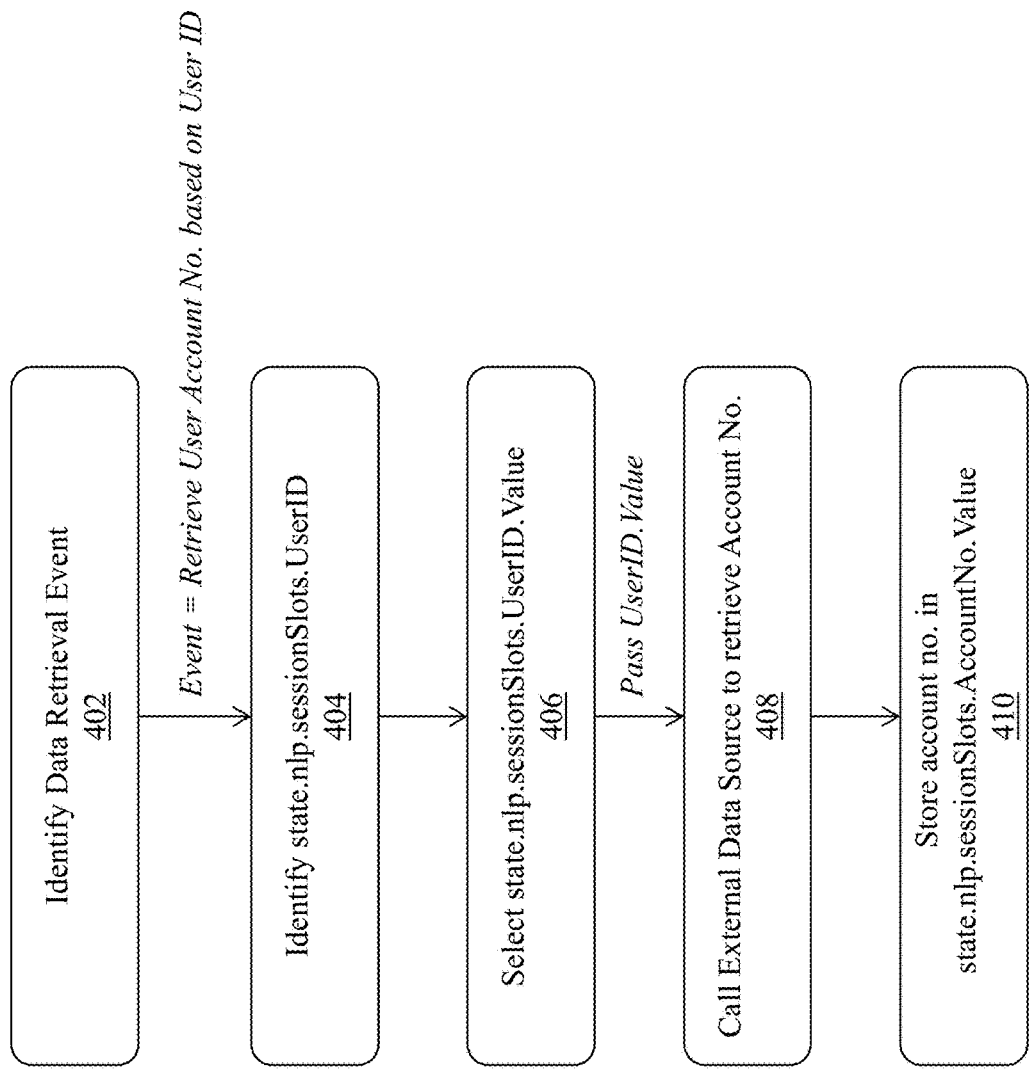
FIG. 4 is a workflow diagram of a method for completion of a data retrieval event for a chat-based communication session.

FIG. 4 is a workflow diagram of a method 400 for completion of a retrieval data event, using the system 100 of FIG. 1. As shown in FIG. 4, the chat session module 108 executes a dialog workflow and identifies (step 402) a data retrieval event—in this instance, the data retrieval event is to retrieve the account number for the user based upon the user ID (e.g., as previously captured from another data source and/or provided by the user during initialization of the chat session and stored in the data storage area 112). For example, the chatbot of chat session module 108 may be preparing a response to the user using the dynamic expression "Now retrieving the latest transaction information for your account no. {{state.nlp.sessionSlots.AccountNo.Value}} . . . " Upon detecting the data retrieval event, the chat session module 108 can determine that the event requires data from an external data source. For example, the data retrieval event can include a reference to an API call for an external resource that requires the user ID number as a parameter to be passed in. The chat session module 108 can connect to the external resource and prepare the API request, then instruct the data event processing module 110 to process the data retrieval event to obtain the user ID number. The data event processing module 110 identifies (step 404) the data storage slot 112b associated with the user ID number, i.e., state.nlp.sessionSlots.UserID. The data event processing module 110 selects (step 406) the value for the user ID number from state.nlp.sessionSlots.UserID.Value and returns the value to the chat session module 108. The chat session module 108 calls (step 408) the external data source using the user ID value as an input parameter and receives a response from the external data source that contains the account number value. The chat session module 108 stores the account number value in another data storage slot 112a, i.e., state.nlp.sessionSlots.AccountNo.Value and the chatbot can then use the data storage slot 112a to generate the message to the user as indicated above.

Figure 5:
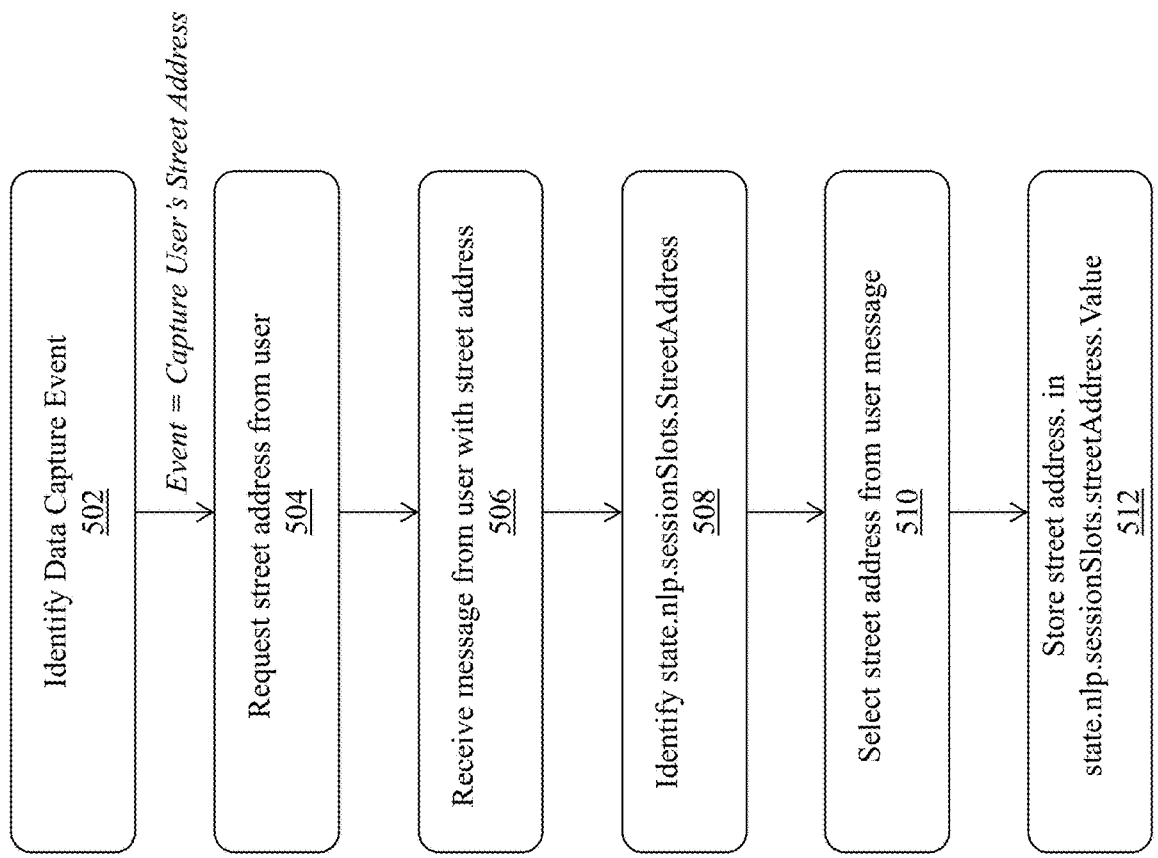
FIG. 5 is a workflow diagram of a method for completion of a data capture event for a chat-based communication session.

FIG. 5 is a workflow diagram of a method 500 for completion of a data capture event, using the system 100 of FIG. 1. As shown in FIG. 5, the chat session module 108 executes a dialog workflow and identifies (step 502) a data capture event—in this instance, the data capture event is to store the user's street address in the data storage area 112 for later use in the chat session (e.g., if the user is seeking assistance with returning a product, the street address can be used to look up nearby shipment drop-off locations, etc.). For example, the chatbot of chat session module 108 may be preparing a message to the user, such as "Please provide your street address." Upon detecting the data capture event, the chat session module 108 can request (step 504) the street address from the user by generating the above-referenced text message and sending the message to the client computing device 102a, then wait for the user to enter in the requested information and submit a response message. The chat session module 108 receives (step 506) the response message from the client computing device 102a that contains the street address. The chat session module 108 then instructs the data event processing module to process the data capture event. The data event processing module 110 identifies (step 508) the data storage slot 112n associated with the street address, i.e., state.nlp.sessionSlots.StreetAddress. For example, the data event processing module 110 can initialize a new data storage slot 112n and generate a name for the data storage slot 112n (StreetAddress). The data event processing module 110 selects (step 508) the street address from the user message (e.g., by parsing the text message and extracting the relevant information) and then the module 110 stores (step 512) the extracted street address in the data storage slot 112n, i.e., state.nlp.sessionSlots.StreetAddress.Value.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOW), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computer system for session-based data storage for chat-based communication sessions, the system comprising a computing device having a memory that stores computer-executable instructions and a processor that executes the computer-executable instructions to:

connect to a data storage area associated with an active chat-based communication session, the data storage area comprising one or more data storage slots;

identify a first data event during the active chat-based communication session, the first data event comprising one of a data capture event, a data retrieval event, or a data prefill event;

identify a data storage slot in the data storage area corresponding to the first data event, the data storage slot comprising a slot name, a slot value, and a lifecycle value;

select one or more data elements associated with the active chat-based communication session for insertion into the data storage slot based upon the event type of the first data event;

store the selected data elements in the data storage slot for retrieval during the active chat-based communication session; and determine, based upon the lifecycle value, whether to remove the selected data elements in the data storage slot after a single use during the chat-based communication session or to keep the selected data elements in the data storage slot until the chat-based communication session is ended.

2. The system of claim 1, wherein, when the first data event is a data retrieval event, selecting one or more data elements associated with the active chat-based communication session comprises retrieving one or more data elements from one of (i) session context data for the chat-based communication session or (ii) an external data source.

3. The system of claim 1, wherein the one or more data elements are selected from (i) a response message in the active chat-based communication session, (ii) session context data for the active chat-based communication session, or (iii) other data storage slots in the data storage area.

4. The system of claim 3, wherein the computing device captures the session context data when the active chat-based communication session is initialized.

5. The system of claim 4, wherein the session context data comprises attributes of a user of the remote computing device and attributes of the active chat-based communication session.

6. The system of claim 1, wherein the slot value of the data storage slot comprises a dynamic expression.

7. The system of claim 6, wherein selecting one or more data elements associated with the active chat-based communication session for insertion into the data storage slot based upon the event type of the first data event comprises evaluating the dynamic expression to determine one or more data elements to insert into the data storage slot.

8. The system of claim 1, wherein the slot value of the data storage slot comprises a static data element.

9. The system of claim 1, wherein, when the first data event is a data prefill event, selecting one or more data elements associated with the active chat-based communication session comprises:
- determining a data element to be requested from the remote computing device during the active chat-based communication session;
- identifying another data storage slot in the data storage area that is associated with the data element to be requested from the remote computing device;
- validate the slot value of the another data storage slot, and when the slot value of the another data storage slot is invalid, generate a request for the data element from the remote computing device and insert the request for the data element into the active chat-based communication session.

10. The system of claim 9, wherein validating the slot value of the another data storage slot comprises determining that the slot value of the another data storage slot is one of a non-zero value or a non-null value.

11. The system of claim 10, wherein determining that the slot value of the another data storage slot is one of a non-zero value or a non-null value comprises evaluating a dynamic expression in the slot value of the another data storage slot.

12. The system of claim 1, wherein the active chat-based communication session is established with the remote computing device via a virtual assistant application.

13. The system of claim 2, wherein retrieving one or more data elements from an external data source comprises applying a function that transforms the one or more data elements before storing the one or more data elements in the slot value of the data storage slot.

14. The system of claim 1, wherein the first data event is part of a dialog workflow that comprises a plurality of data events.

15. A computerized method of session-based data storage for chat-based communication sessions, the method comprising:
- connecting a computing device to a data storage area associated with an active chat-based communication session, the data storage area comprising one or more data storage slots;
- identifying, by the computing device, a first data event during the active chat-based communication session, the first data event comprising one of a data capture event, a data retrieval event, or a data prefill event;
- identifying, by the computing device, a data storage slot in the data storage area corresponding to the first data event, the data storage slot comprising a slot name, a slot value, and a lifecycle value;
- selecting, by the computing device, one or more data elements associated with the active chat-based communication session for insertion into the data storage slot based upon the event type of the first data event;
- storing, by the computing device, the selected data elements in the data storage slot for retrieval during the active chat-based communication session; and
- determining, by the computing device based upon the lifecycle value, whether to remove the selected data elements in the data storage slot after a single use during the chat-based communication session or to keep the selected data elements in the data storage slot until the chat-based communication session is ended.

16. The method of claim 15, wherein, when the first data event is a data retrieval event, selecting one or more data elements associated with the active chat-based communication session comprises retrieving one or more data elements from one of (i) session context data for the chat-based communication session or (ii) an external data source.

17. The method of claim 15, wherein the one or more data elements are selected from (i) a response message in the active chat-based communication session, (ii) session context data for the active chat-based communication session, or (iii) other data storage slots in the data storage area.

18. The method of claim 17, wherein the computing device captures the session context data when the active chat-based communication session is initialized.

19. The method of claim 18, wherein the session context data comprises attributes of a user of the remote computing device and attributes of the active chat-based communication session.

20. The method of claim 15, wherein the slot value of the data storage slot comprises a dynamic expression.

21. The method of claim 20, wherein selecting one or more data elements associated with the active chat-based communication session for insertion into the data storage slot based upon the event type of the first data event comprises evaluating the dynamic expression to determine one or more data elements to insert into the data storage slot.

22. The method of claim 15, wherein the slot value of the data storage slot comprises a static data element.

23. The method of claim 15, wherein, when the first data event is a data prefill event, selecting one or more data elements associated with the active chat-based communication session comprises:
- determining a data element to be requested from the remote computing device during the active chat-based communication session;
- identifying another data storage slot in the data storage area that is associated with the data element to be requested from the remote computing device;
- validate the slot value of the another data storage slot, and when the slot value of the another data storage slot is invalid, generate a request for the data element from the remote computing device and insert the request for the data element into the active chat-based communication session.

24. The method of claim 23, wherein validating the slot value of the another data storage slot comprises determining that the slot value of the another data storage slot is one of a non-zero value or a non-null value.

25. The method of claim 24, wherein determining that the slot value of the another data storage slot is one of a non-zero value or a non-null value comprises evaluating a dynamic expression in the slot value of the another data storage slot.

26. The method of claim 15, wherein the active chat-based communication session is established with the remote computing device via a virtual assistant application.

27. The method of claim 16, wherein retrieving one or more data elements from an external data source comprises applying a function that transforms the one or more data elements before storing the one or more data elements in the slot value of the data storage slot.

28. The method of claim 15, wherein the first data event is part of a dialog workflow that comprises a plurality of data events.

* * * * *